United States Patent
Shanmukha et al.

(10) Patent No.: US 12,170,474 B2
(45) Date of Patent: Dec. 17, 2024

(54) ELECTRIC MACHINE HAVING ROTOR HUB WITH SHAPED PASSAGES FOR COOLING

(71) Applicant: Rolls-Royce Corporation, Indianapolis, IN (US)

(72) Inventors: Rama Krishna Shanmukha, London (GB); Anand Mathivanan, Indianapolis, IN (US); Jenn Yen Loh, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 234 days.

(21) Appl. No.: 17/887,947

(22) Filed: Aug. 15, 2022

(65) Prior Publication Data

US 2024/0055945 A1    Feb. 15, 2024

(51) Int. Cl.
*H02K 7/18* (2006.01)
*B64D 27/24* (2006.01)
*B64D 27/02* (2006.01)
*B64D 27/10* (2006.01)

(52) U.S. Cl.
CPC ........... *H02K 7/1838* (2013.01); *B64D 27/24* (2013.01); *B64D 27/026* (2024.01); *B64D 27/10* (2013.01); *F05D 2260/20* (2013.01)

(58) Field of Classification Search
CPC ...... B64D 27/026; B64D 27/10; B64D 27/24; F05D 2260/20; H02K 7/1838
USPC ................................................... 310/216.119
See application file for complete search history.

(56) References Cited

U.S. PATENT DOCUMENTS

| | | | |
|---|---|---|---|
| 5,148,090 A * | 9/1992 | Oku | H02K 19/103 310/216.013 |
| 5,223,757 A | 6/1993 | Staub et al. | |
| 5,266,859 A * | 11/1993 | Stanley | H02K 19/103 310/216.012 |
| 6,239,520 B1 | 5/2001 | Stahl et al. | |
| 6,459,179 B1 | 10/2002 | Lynch et al. | |
| 7,489,057 B2 | 2/2009 | Zhou et al. | |
| 9,148,041 B2 | 9/2015 | Knoblauch et al. | |
| 9,154,019 B2 | 10/2015 | Galler et al. | |
| 9,748,809 B2 | 8/2017 | Daboussi et al. | |
| 10,873,229 B2 | 12/2020 | Sheppard et al. | |
| 11,205,931 B2 | 12/2021 | Froehlich et al. | |
| 11,316,394 B2 | 4/2022 | Klonowski et al. | |
| 2002/0195887 A1 | 12/2002 | Kobayaski et al. | |
| 2005/0057106 A1 | 3/2005 | Allen et al. | |
| 2007/0273232 A1 | 11/2007 | Ong et al. | |
| 2008/0197725 A1* | 8/2008 | Husband | H02K 9/04 310/59 |

(Continued)

FOREIGN PATENT DOCUMENTS

| | | |
|---|---|---|
| EP | 0926805 B1 | 4/2011 |
| JP | 4398212 | 1/2010 |

(Continued)

*Primary Examiner* — Rashad H Johnson
(74) *Attorney, Agent, or Firm* — Barnes & Thornburg LLP (57) ABSTRACT

An electric machine adapted for use in a gas turbine engine includes a shaft extending along a central axis, a magnetic rotor drum, and a non-magnetic rotor hub rotatably coupled with the shaft and the magnetic rotor drum. The magnetic rotor drum includes a rotor and a plurality of magnets arranged circumferentially about the central axis.

20 Claims, 9 Drawing Sheets

(56) References Cited

U.S. PATENT DOCUMENTS

| | | | | |
|---|---|---|---|---|
| 2011/0273040 A1* | 11/2011 | Chamberlin | ............. | H02K 1/32 |
| | | | | 310/59 |
| 2011/0298319 A1* | 12/2011 | Chamberlin | ........... | H02K 5/203 |
| | | | | 310/61 |
| 2014/0354090 A1* | 12/2014 | Chamberlin | ........... | H02K 5/203 |
| | | | | 310/54 |
| 2015/0042099 A1* | 2/2015 | Muniz | .................. | H02K 1/2773 |
| | | | | 290/55 |
| 2015/0180295 A1* | 6/2015 | Casazza | .................... | F03D 9/25 |
| | | | | 290/55 |
| 2015/0222151 A1* | 8/2015 | Semken | ................... | H02K 1/18 |
| | | | | 29/452 |
| 2015/0288254 A1* | 10/2015 | Söderholm | ............. | H02K 1/32 |
| | | | | 310/54 |
| 2018/0112595 A1* | 4/2018 | Johns | ........................ | F02C 3/16 |
| 2019/0006913 A1* | 1/2019 | Stieger | ................... | H02K 9/197 |
| 2019/0052139 A1* | 2/2019 | Stieger | ................... | F01D 15/10 |
| 2019/0260267 A1* | 8/2019 | Diemunsch | ........... | F04D 19/007 |
| 2019/0319514 A1* | 10/2019 | Williams | ................ | F01D 5/225 |
| 2020/0036250 A1* | 1/2020 | Krais | ..................... | H02K 9/197 |
| 2021/0194305 A1* | 6/2021 | Huang | ................... | B33Y 80/00 |
| 2024/0055945 A1* | 2/2024 | Shanmukha | ........... | B64D 27/33 |
| 2024/0055947 A1* | 2/2024 | Shanmukha | ............. | H02K 9/06 |
| 2024/0113583 A1* | 4/2024 | Tanaka | .................. | B64D 33/08 |

FOREIGN PATENT DOCUMENTS

| | | |
|---|---|---|
| JP | 2014033584 | 2/2014 |
| WO | 2015188977 A1 | 12/2015 |

* cited by examiner

ELECTRIC MACHINE HAVING ROTOR HUB WITH SHAPED PASSAGES FOR COOLING

FIELD OF THE DISCLOSURE

The present disclosure relates generally to electric machines adapted for use with gas turbine engines, and more specifically to air cooling the rotors of such electric machines.

BACKGROUND

Gas turbine engines are used to power aircrafts, watercrafts, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may be used in a hybrid electric propulsion system used to power the aircraft. The hybrid electric propulsion system has an electric machine powered directly or indirectly form the gas turbine engine. The electric machine is configured to power a propeller for providing thrust for the aircraft.

Electric machines generate heat during use and may need to be cooled during operation of the system. Separate external fans may be used to cool the electric machine; however, the external fans add weight to the aircraft and result in components of the electric machine being modified to provide the cooling air therein. A lightweight, non-intrusive component of the electric machine to cool the magnetic rotor drum is desired.

SUMMARY

The present disclosure may comprise one or more of the following features and combinations thereof.

An electric machine adapted for use in a gas turbine engine may include a shaft, a magnet rotor drum, and a non-magnetic rotor hub. The shaft may extend along an axis and may be configured to rotate about the axis. The magnetic rotor drum may include a rotor drum body and a plurality of magnets arranged circumferentially about the axis and coupled with the rotor drum body for rotation therewith. The non-magnetic rotor hub may be rotatably coupled with the shaft and the magnetic rotor drum.

In some embodiments, the rotor hub may be configured to cool the magnetic rotor drum in response to rotation of the shaft about the axis. The non-magnetic rotor hub may have a first face, a second face spaced apart axially from the first face, and a plurality of cooling channels that extend axially through the non-magnetic rotor hub and open into the first face and the second face.

In some embodiments, each of the plurality of cooling channels may have an inlet opening formed on the first face at a first circumferential location and an outlet opening formed on the second face at a second circumferential location. The second circumferential location may be offset from the first circumferential location.

In some embodiments, each of the plurality of cooling channels may be skewed circumferentially as the plurality of cooling channels extend from the inlet opening to the outlet opening. The plurality of cooling channels may be skewed circumferentially to cause air to be drawn through the plurality of cooling channels and cool the magnetic rotor drum in response to rotation of the shaft about the axis.

In some embodiments, the non-magnetic rotor hub may have an inner ring, an outer ring, and plurality of radially extending and circumferentially skewed walls that extend radially between the inner ring and the outer ring to define the plurality of cooling channels. The inner ring may be arranged around the shaft. The outer ring may be spaced apart radially from the inner ring and coupled with the rotor drum body of the magnetic rotor drum.

In some embodiments, the inner ring may have a constant diameter and the outer ring may have a constant diameter. Each wall may have a first circumferential surface and a second circumferential surface that is parallel with the first circumferential surface.

In some embodiments, a cross-sectional shape of each of the plurality of cooling channels when viewed axially may be fixed. The cross-sectional shape of each of the plurality of cooling channels may be fixed as each of the plurality of cooling channels extends axially and skews circumferentially. In some embodiments, the cross-sectional shape of each of the plurality of cooling channels may be non-circular.

In some embodiments, each of the plurality of cooling channels may have a circumferential arc angle. The circumferential arc angle may be greater than a circumferential arc angle of any one of the plurality of magnets.

In some embodiments, a number of the plurality of cooling channels may be equal to or less than a number of the plurality of magnets. The number of the plurality of cooling channels may be equal to the number of the plurality of magnets. The number of the plurality of cooling channels may be less than the number of the plurality of magnets.

In some embodiments, each of the plurality of magnets may have a surface area defined between axial ends and circumferential ends of the magnet. In some embodiments, at least 50 percent of the surface area may overlap one or more of the plurality of channels when viewed radially.

In some embodiments, the outlet opening of each of the plurality of cooling channels may be offset circumferentially from the inlet opening of the respective cooling channel. The outlet opening of each of the plurality of cooling channels may be offset circumferentially between 20 degrees and 90 degrees from the inlet opening of the respective cooling channel. In some embodiments, the inlet opening and the outlet opening of each of the plurality of cooling channels may be at a same radial distance from the axis.

According to another aspect of the present disclosure, an electric machine adapted for use in a gas turbine engine may include a shaft extending along a central axis, a magnetic rotor drum, and a non-magnetic rotor hub. The shaft may be configured to rotate about the central axis. The magnetic rotor drum may include a rotor and a plurality of magnets arranged circumferentially about the central axis and coupled with the rotor for rotation therewith. The non-magnetic rotor hub may be rotatably coupled with the shaft and the magnetic rotor drum.

In some embodiments, the non-magnetic rotor hub may have a plurality of cooling channels. Each of the plurality of cooling channels may skew circumferentially as they extend axially through the non-magnetic rotor hub to cause air to be drawn through the plurality of cooling channels and cool the magnetic rotor drum in response to rotation of the shaft about the axis.

In some embodiments, each of the plurality of cooling channels may include an inlet opening and an outlet opening. The inlet opening may be formed at a first circumferential location of the non-magnetic rotor hub. The outlet opening may be formed at a second circumferential location of the non-magnetic rotor hub. The second circumferential location may be offset from the first circumferential location.

In some embodiments, the inlet opening may be axially spaced from the outlet opening. The inlet opening and the outlet opening of each of the plurality of cooling channels may be at a same radial distance from the axis.

In some embodiments, each of the plurality of magnets may include a first end and a second end axially spaced from the first end. At least a portion of the inlet opening of a first cooling channel of the plurality of cooling channels may be circumferentially aligned with the first end of a first magnet of the plurality of magnets. At least a portion of the outlet opening of the first cooling channel may be circumferentially aligned with the second end of a second magnet of the plurality of magnets.

In some embodiments, a third magnet of the plurality of magnets may be circumferentially positioned between the first magnet and the second magnet. In some embodiments, a number of the plurality of cooling channels may be less than a number of the plurality of magnets.

In some embodiments, each of the plurality of cooling channels may be a circumferential arc angle. The circumferential arc angle may be greater than a circumferential arc angle of any one of the plurality of magnets.

In some embodiments, each of the plurality of magnets may have a surface area defined between axial ends and circumferential ends of the magnet. At least 50 percent of the surface area may overlap one or more of the plurality of channels when viewed radially.

According to another aspect of the present disclosure, a method may include forming a plurality of cooling channels in a non-magnetic rotor hub. The plurality of cooling channels may be formed in the rotor hub such that each of the plurality of cooling channels skews circumferentially as the cooling channel extends axially relative to an axis.

In some embodiments, the method may further include coupling the non-magnetic rotor hub with a shaft. The shaft may extend axially into the non-magnetic rotor hub for rotation with the shaft.

In some embodiments, the method may further include coupling the non-magnetic rotor hub with a magnetic rotor drum. The magnetic rotor drum may include a rotor and a plurality of magnets arranged circumferentially about the axis such that the rotor extends circumferentially around the non-magnetic rotor hub.

In some embodiments, the non-magnetic rotor hub may have an inner ring having a constant diameter arranged around the shaft, an outer ring having a constant diameter spaced apart radially from the inner ring and coupled with the rotor of the magnetic rotor drum, and a plurality of radially extending and circumferentially skewed walls. The wall may extend radially between the inner ring and the outer ring to define the plurality of cooling channels. In some embodiments, an inlet opening and an outlet opening of each of the plurality of cooling channels may be at a same radial distance.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
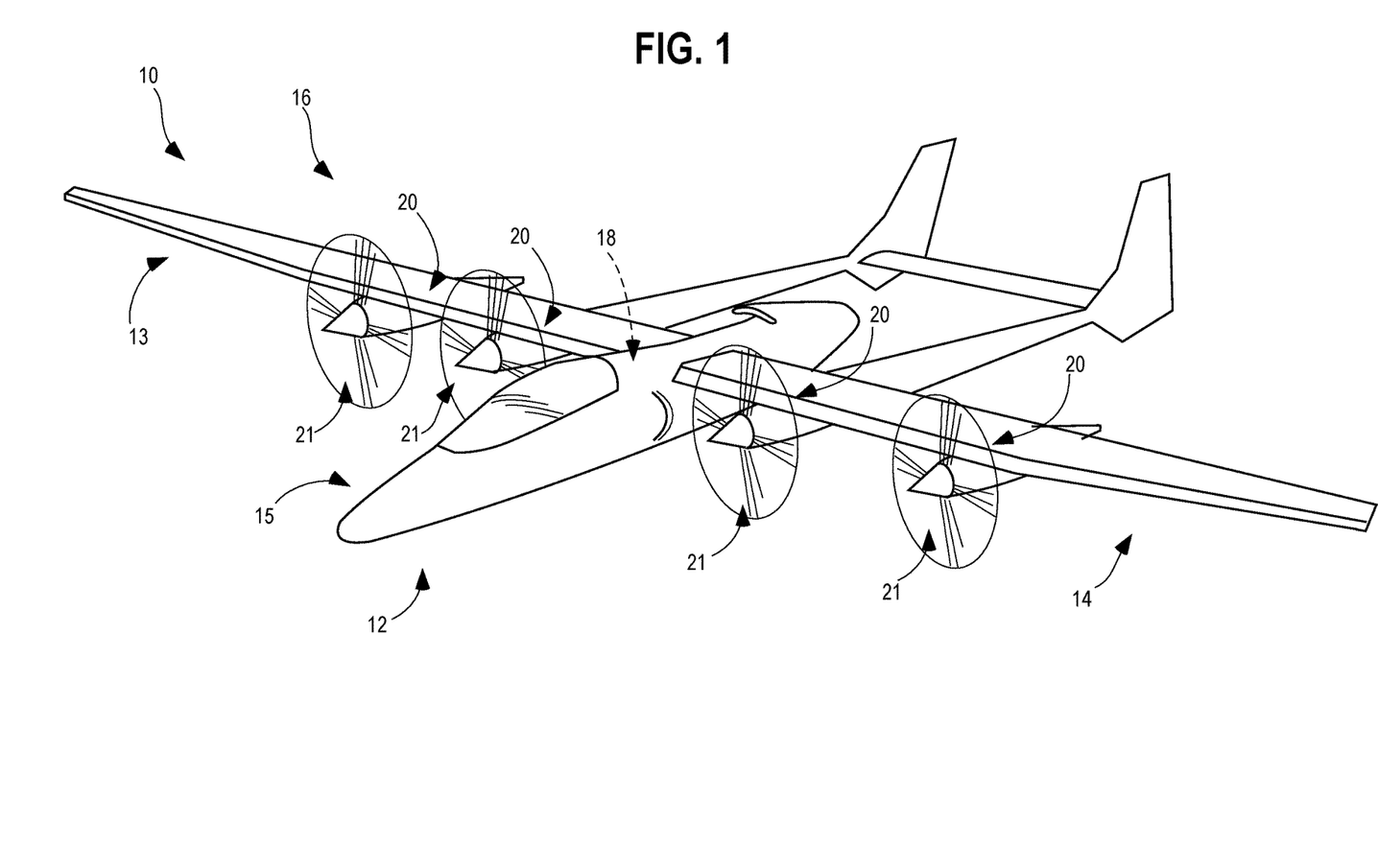
FIG. 1 a perspective view of an aircraft showing the aircraft including an airframe with wings and a hybrid electric propulsion system having a gas turbine engine and an electric machine in accordance with the present disclosure coupled with one of the propellers and configured to power the propeller for providing thrust for the aircraft.
Figure 2:
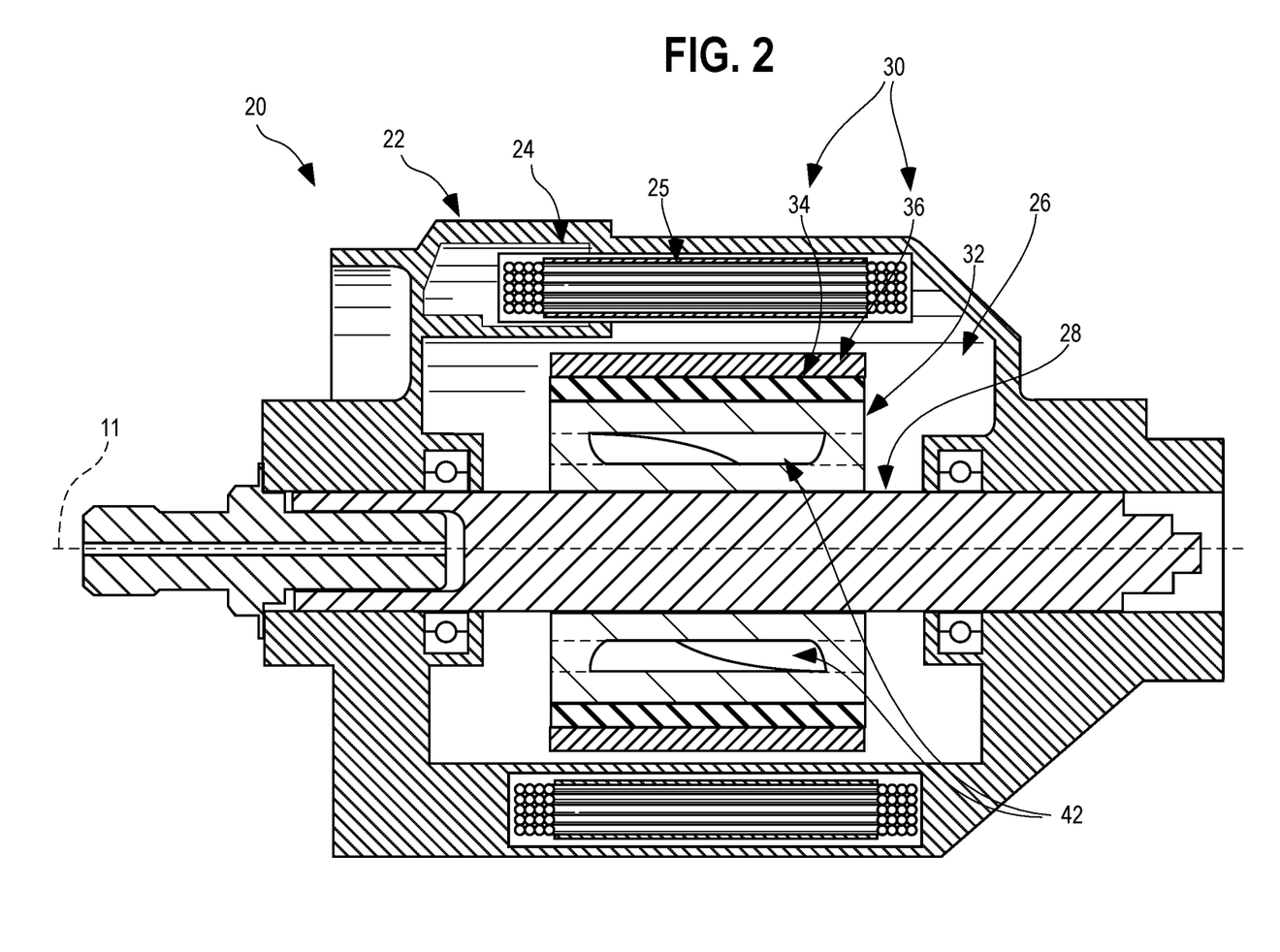
FIG. 2 is a cross-sectional view of the electric machine of FIG. 1 showing that the electric machine includes a rotor assembly and a stator arranged around the rotor assembly, the rotor assembly including a shaft, a magnetic rotor drum, and a non-magnetic rotor hub having a plurality of cooling channels configured to direct air through the hub to cool the electric machine.

An aircraft 10 having an electric machine 20 in accordance with the present disclosure is shown, for example, in FIG. 1. The aircraft 10 includes an airframe 12 with wings 13, 14 extending from a fuselage 15 and an electric propulsion system 16. The electric propulsion system 16 includes a gas turbine engine 18, an electric machine 20, and a propeller 21 or other propulsor as shown in FIGS. 1 and 2. In some embodiments, the electric propulsion system further includes one or more generators, motors, and/or batteries. In the illustrative embodiment, the electric machine 20 is a motor. In some embodiments, the electric machine 20 is a motor-generator.

Figure 3:
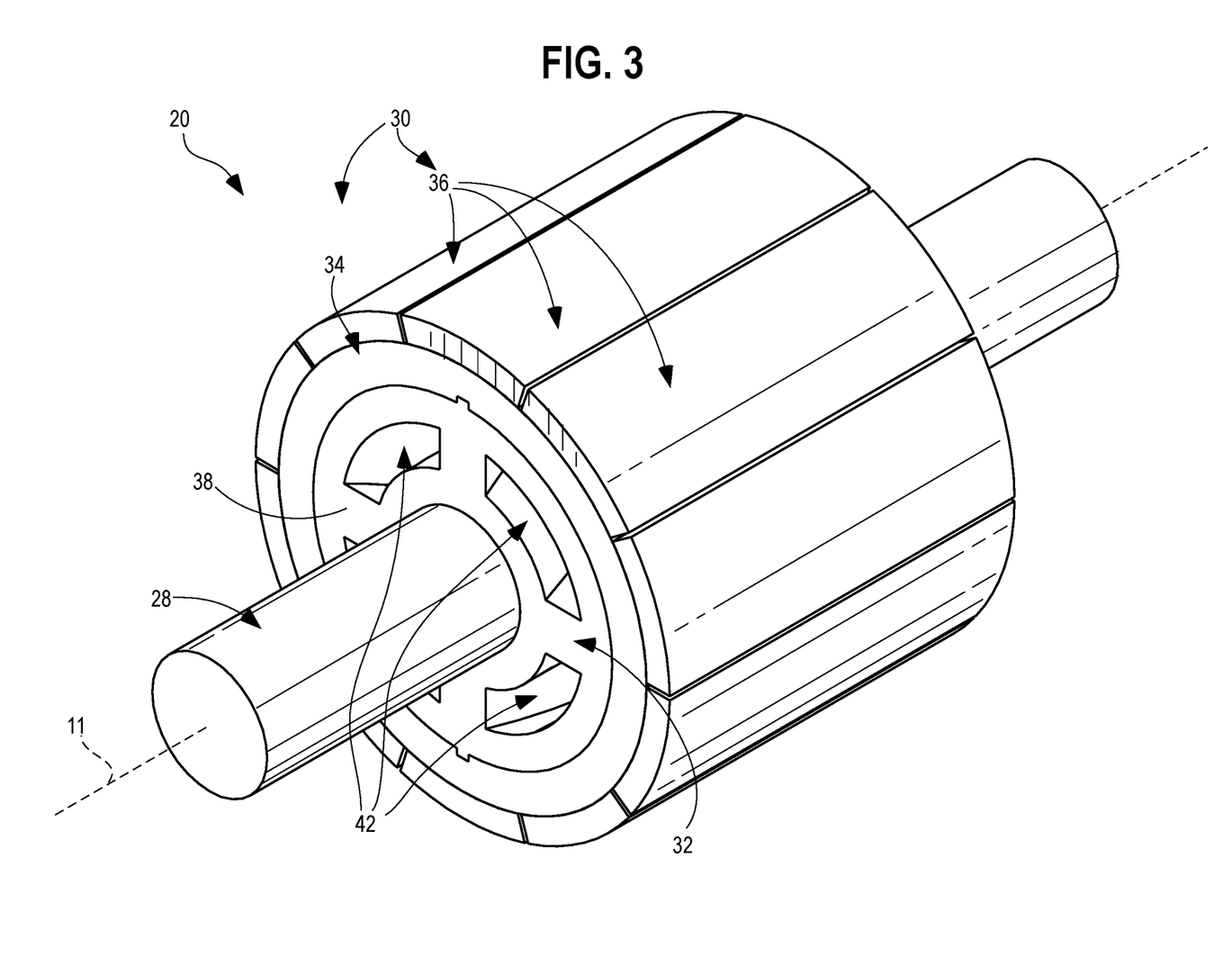
FIG. 3 is a perspective view of the rotor assembly included in the electric machine of FIG. 2 showing that the rotor assembly includes the shaft extending along an axis of the electric machine, the magnetic rotor drum with a rotor drum body and a plurality of magnets coupled with the rotor drum body, and the non-magnetic rotor hub arranged to interconnect the shaft and the magnetic rotor drum, and further showing the non-magnetic rotor hub includes an inner ring arranged around the shaft, an outer ring spaced apart radially from the inner ring and coupled with the rotor of the magnetic rotor drum, and a plurality of radially extending walls that extend radially between the inner ring and the outer ring to define the plurality of cooling channels.
Figure 4:
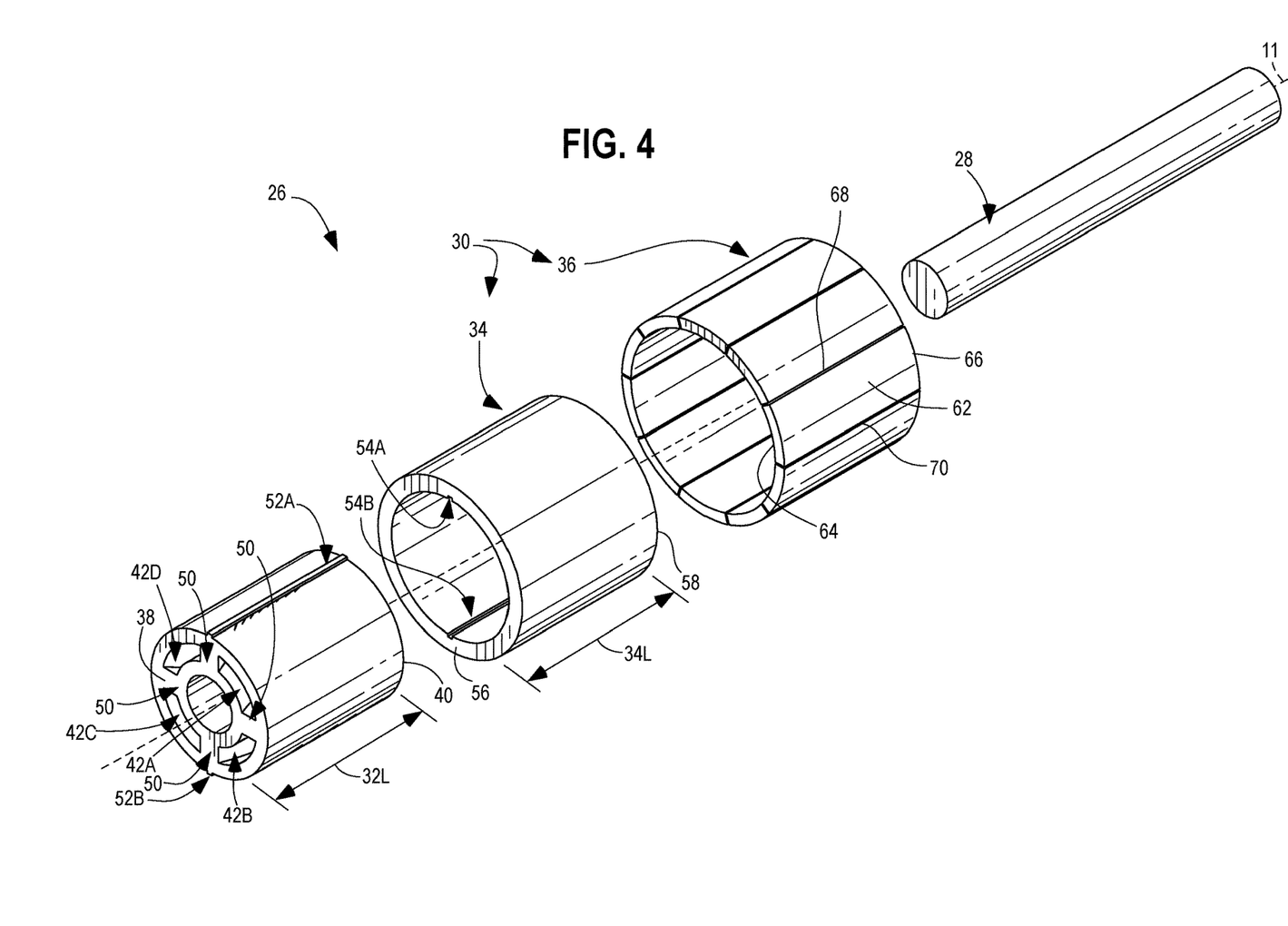
FIG. 4 is an exploded view of the rotor assembly of FIG. 3 showing the rotor assembly includes the shaft, the rotor drum body and the plurality of magnets of the magnetic rotor drum, and the non-magnetic rotor drum has a key feature configured to be received in a slot formed in the rotor drum body of the magnetic rotor drum to key the rotor hub with the magnetic rotor drum.

The electric machine 20 includes a case 22, a stator 24 coupled with the case 22, and a rotor assembly 26 supported by the case 22 as shown in FIG. 2. The rotor assembly 26 is configured to rotate about an axis 11 relative to the case 22 and the stator 24. The rotor assembly 26 is formed to define a plurality of cooling channels 42A, 42B, 42C, 42D that extend axially through the rotor assembly 26 and draw air through the rotor assembly 26 in response to rotation of the rotor assembly 26 about the axis 11. In the illustrative embodiment, the plurality of cooling channels 42A, 42B, 42C, 42D are circumferentially skewed as shown in FIGS. 3 and 4.

The electric machine 20 generates heat during use, which may cause the temperature of the rotor assembly 26 to increase without any active cooling. This may reduce the operating life of the electric machine 20. Other rotor cooling systems may use external fans to actively cool the electric machine 20. However, the external fan structure adds weight to the system 16.

Therefore, the rotor assembly 26 of the electric machine 20 includes a rotor hub 32 that is shaped to define the plurality of circumferentially skewed cooling channels 42A, 42B, 42C, 42D as shown in FIGS. 3-7. The plurality of circumferentially skewed cooling channels 42A, 42B, 42C, 42D draw air through the rotor assembly 26 in response to rotation of the rotor assembly 26 about the axis 11 to transfer heat from a magnetic rotor drum 30 included in the rotor assembly 26.

Turning again to the electric machine 20, the electric machine 20 is powered directly or indirectly from the gas turbine engine 18 and/or one or more batteries. The gas turbine engine 18 combusts compressed air and fuel to produce rotational mechanical power. The rotational mechanical power produced by the gas turbine engine may be directly transferred to the electric machine 20 to drive rotation of the electric machine 20, as contemplated for the illustrative embodiment.

In other embodiments, the rotational mechanical power is used to drive rotation of a generator to produce electrical energy. The electrical energy from the generator may be transmitted to the electric machine 20 to drive rotation of the electric machine 20 and/or may be transmitted to the one or more batteries for storage and use by the electric machine 20 at a later time.

The electric machine 20 includes the case 22, the stator 24, and the rotor assembly 26 as shown in FIG. 2. The case 22 is included in or coupled with a nacelle that is fixed with one of the wings 13, 14. The stator 24 includes a plurality of windings 25 that are arranged around the axis 11. For example, the windings 25 include coper windings configured to be electrically energized to provide an electromagnetic field. The rotor assembly 26 is coupled with the propeller 21. The rotor assembly 26 includes the magnetic rotor drum 30 having a plurality of magnets 36 and is configured to be driven to rotate about the axis 11 by the energized stator 24 to drive the propeller 21.

The rotor assembly 26 includes a shaft 28, the magnetic rotor drum 30, and the non-magnetic rotor hub 32 as shown in FIGS. 2-5. The shaft 28 extends along the central axis 11 and is rotatable about the axis 11 to drive the magnetic rotor drum 30. The magnetic rotor drum 30 includes a rotor drum body 34 and the plurality of magnets 36 coupled to the rotor drum body 34. The rotor hub 32 interconnects the shaft 28 and the magnetic rotor drum 30 and is configured move air that surrounds the electric machine 20 to cool the magnetic rotor drum 30 in response to rotation of the shaft 28 about the axis 11.

In the illustrative embodiment, the non-magnetic rotor hub 32 is made of a non-magnetic material so the electromagnetic performance of the plurality of magnets 36 are not affected by the material of the non-magnetic rotor hub 32. In the illustrative embodiment, the non-magnetic rotor hub 32 has the same axial length 34L as the rotor drum body 34. In other embodiments, the axial length 32L of the non-magnetic rotor hub 32 may be less or greater than the axial length 34L of the rotor drum body 34.

The non-magnetic rotor hub 32 is formed to define a first face 38, a second face 40 spaced apart axially from the first face 38, and a plurality of cooling channels 42A, 42B, 42C, 42D as shown in FIGS. 3 and 4. The plurality of cooling channels 42A, 42B, 42C, 42D extend axially through the non-magnetic rotor hub 32 and open into both the first face 38 and the second face 40.

The plurality of cooling channels 42A, 42B, 42C, 42D draw in air upon rotation about the axis 11. The air flows from the first face 38 through the plurality of cooling channels 42A, 42B, 42C, 42D to the second face 40. This drawing of air by the non-magnetic rotor hub 32 cools the plurality of magnets 36 and the rotor drum body 34.

Figure 5:
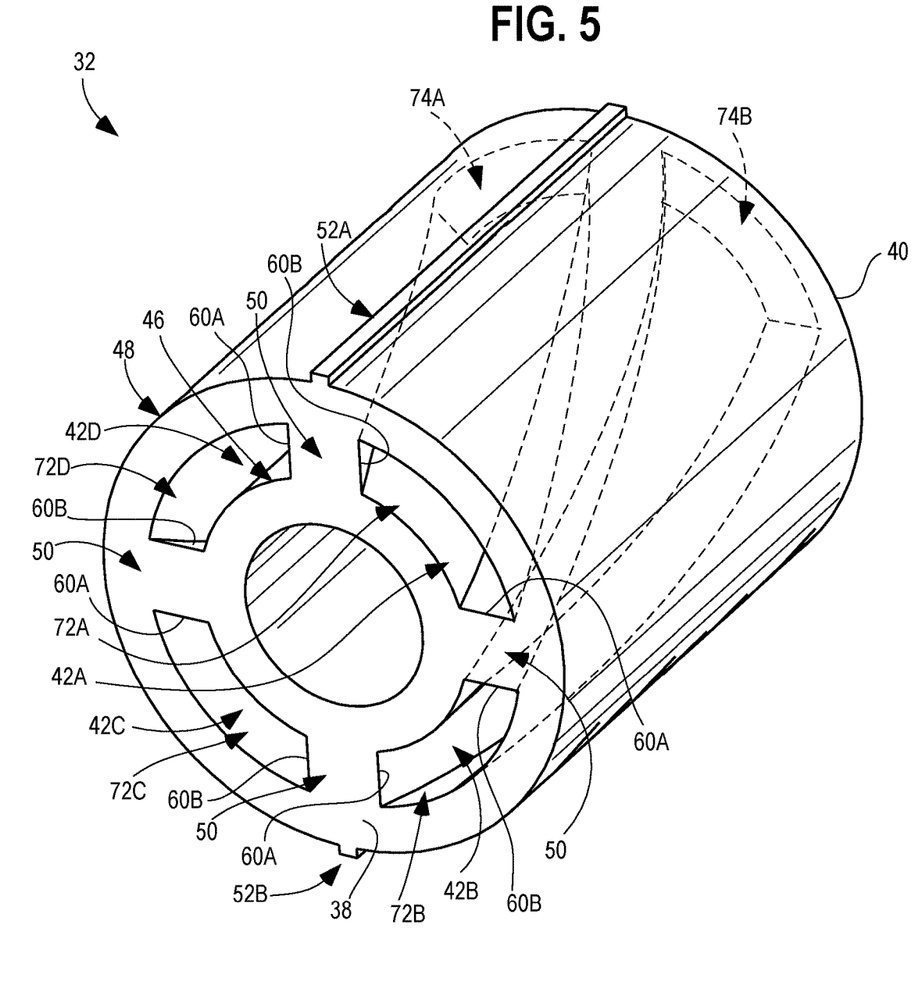
FIG. 5 is a perspective view of the non-magnetic rotor hub included in rotor assembly of FIG. 3 showing that the plurality of cooling channels included in the non-magnetic rotor hub each have an inlet opening formed on a first face of the rotor hub and an outlet opening formed on a second face of the rotor hub that is circumferentially offset from the inlet opening such that the plurality of cooling channels are circumferentially skewed as each of the channels extends between the inlet opening and the outlet opening.

The non-magnetic rotor hub 32 includes an inner ring 46, and outer ring 48 spaced apart radially from the inner ring 46, and a plurality of walls 50 as shown in FIGS. 3-5. The inner ring 46 is arranged around the shaft 28 and has a constant diameter. The outer ring 48 is coupled with the rotor drum body 34 of the magnetic rotor drum 30 and has a constant diameter. The plurality of walls 50 extend radially between the inner ring 46 and the outer ring 48 to define the channels 42A, 42B, 42C, 42D.

In the illustrative embodiment, the walls 50 are circumferentially skewed to define the plurality of circumferentially skewed cooling channels 42A, 42B, 42C, 42D as shown in FIGS. 3-5. The number of radially extending and circumferentially skewed walls 50 determines the number of cooling channels 42A, 42B, 42C, 42D.

In the illustrative embodiment, the outer ring 48 of the rotor hub 32 is formed to define companion keys 52A, 52B that extend radially outward from the outer ring 48 of the non-magnetic rotor hub 32 as shown in FIGS. 3-5. The companion keys 52A, 52B extend axially between the first face 38 and second face 40 of the rotor hub 32. Each of the companion keys 52A, 52B are each configured to extend into a corresponding slot 54A, 54B formed in the rotor drum body 34 of the magnetic rotor drum 30 as shown in FIG. 5

Each of the companion keys 52A, 52B extend radially outward from the outer ring 48 of the rotor hub 32 and each of the slots 54A, 54B open radially inward to receive the corresponding companion key 52A, 52B. The companion keys 52A, 52B have an interference fit with the slots 54A, 54B of the rotor drum body 34 so that the non-magnetic rotor hub 32 is not circumferentially displaced relative to the rotor drum body 34 during operation of the electric machine 20.

In the illustrative embodiment, the companion keys 52A, 52B extend axially between the first face 38 and the second face 40 and the slots 54A, 54B extend axially between a first face 56 and a second face 58 spaced apart axially from the first face 56 of the rotor drum body 34.

In some embodiments, the companion keys 52A, 52B may extend an axial length less than the axial length 32L between the first face 38 and the second face 40. In some embodiments, the rotor drum body 34 and the non-magnetic rotor hub 32 may have more or less than two slots 54A, 54B and companion keys 52A, 52B, respectively.

The first companion key 52A and the first slot 54A are offset from the second companion key 52B and the second slot 54B by 180 degrees. In other embodiments, the first companion key 52A and the first slot 54A may be offset from the second companion key 52B and the second slot 54B by less than 180 degrees.

Figure 6A:
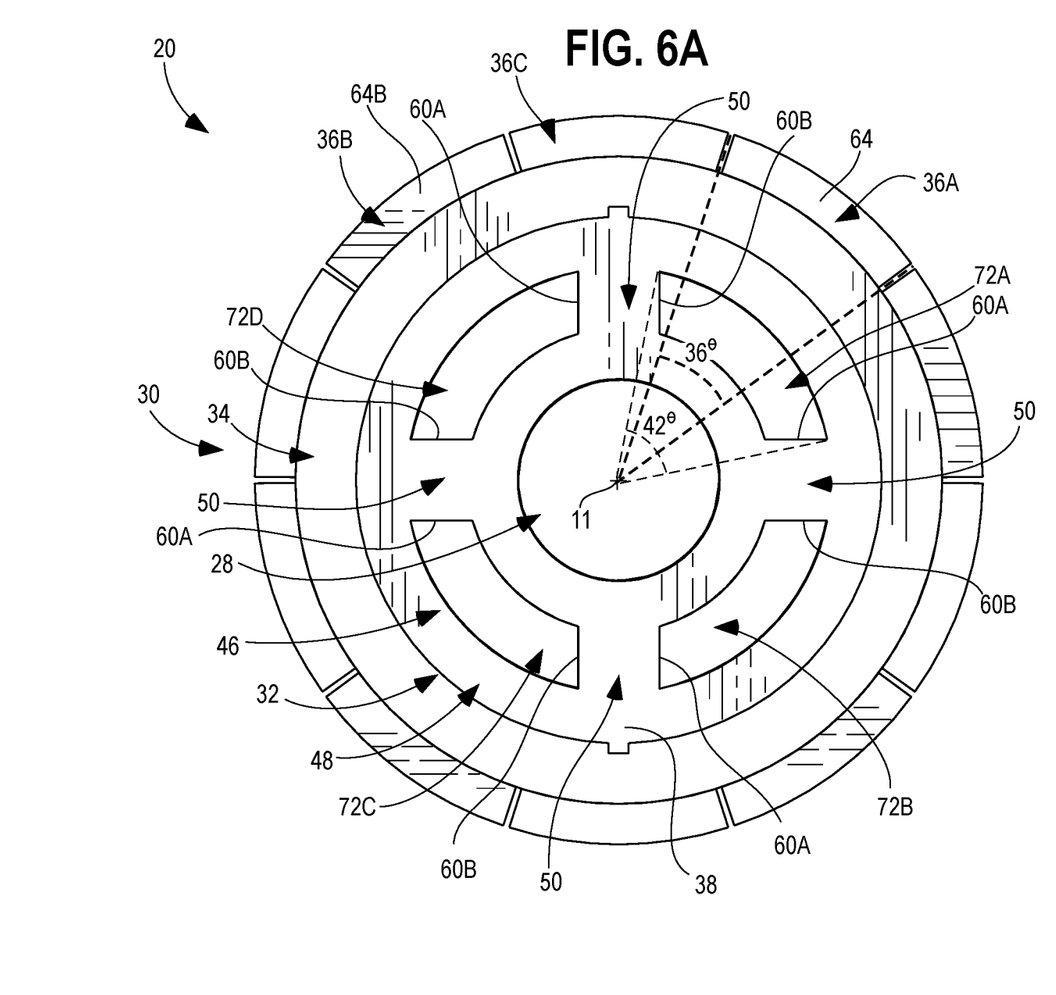
FIG. 6A is a front view of the rotor assembly of FIG. 3 showing that the inlet opening of each cooling channel included in the plurality of cooling channels is at a first circumferential location.
Figure 6B:
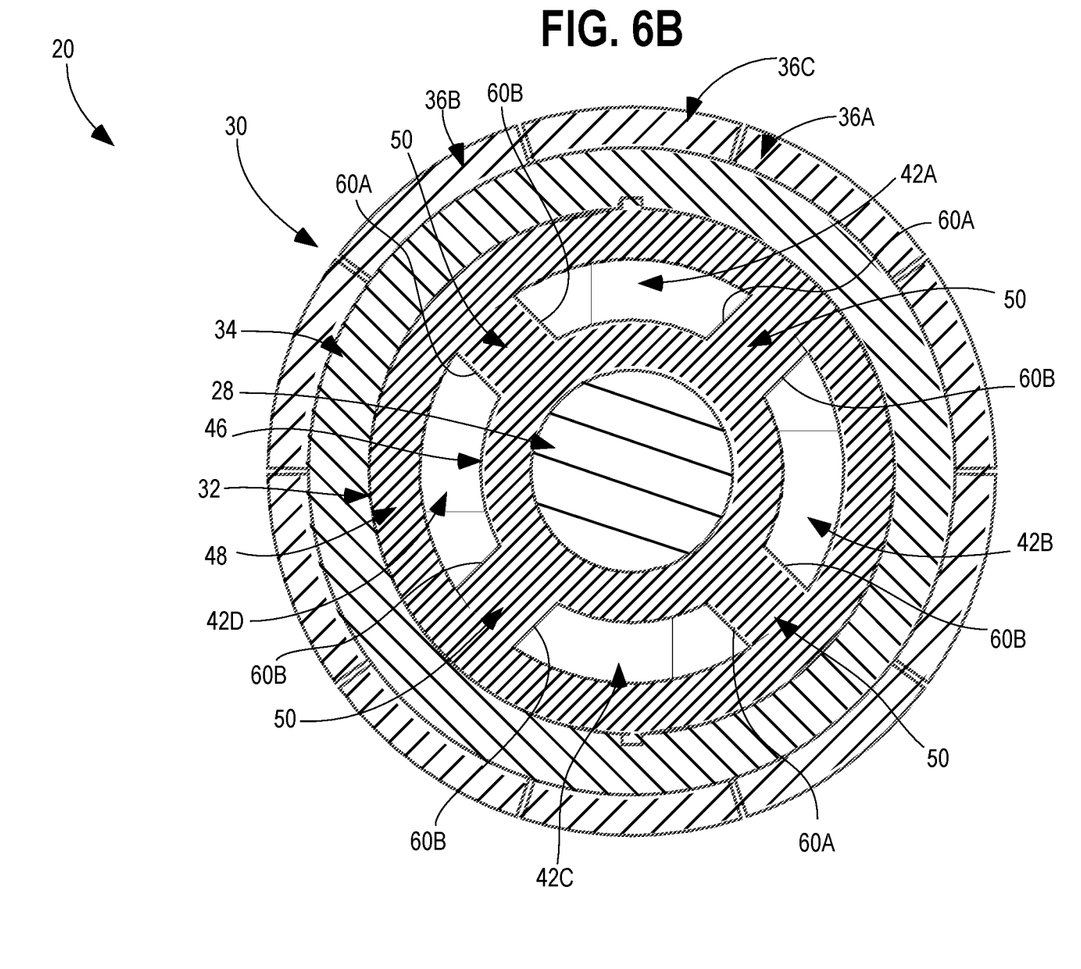
FIG. 6B is a cross-sectional view of the rotor hub of FIG. 3 showing that a cross-sectional shape of each cooling channel included in the plurality of cooling channels remains the same as the cooling channel skews circumferentially about the axis.
Figure 6C:
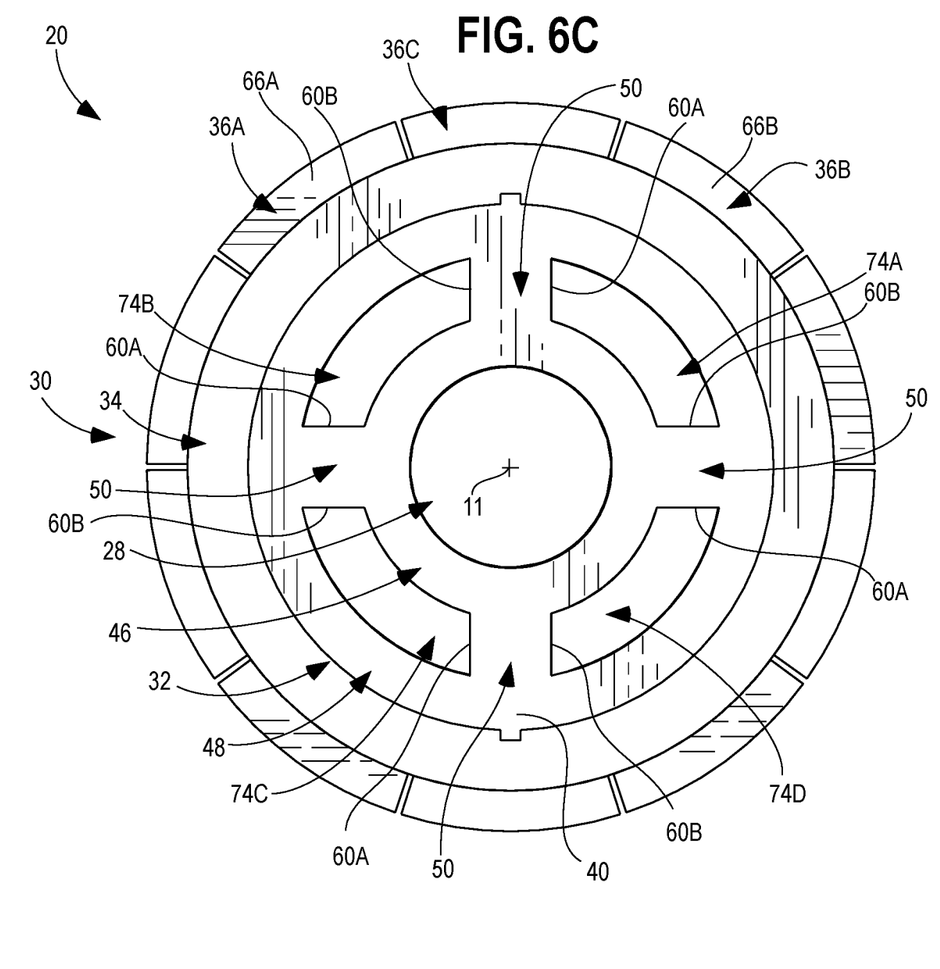
FIG. 6C is a rear view of the rotor assembly of FIG. 3 showing that the outlet opening of each cooling channel included in the plurality of cooling channels is at a second circumferential location that is offset from the first circumferential location.

Each wall 50 includes a first circumferential surface 60A and a second circumferential surface 60B that is parallel with the first circumferential surface 60A. Therefore, as shown in FIGS. 6A-C, a cross-sectional shape of each of the plurality of cooling channels 42A, 42B, 42C, 42D is fixed when viewed axially at different points along the axis 11 as each of the plurality of cooling channels 42A, 42B, 42C, 42D extends axially and skews circumferentially. In the illustrative embodiment, the cross-sectional shape of each of the plurality of cooling channels 42A, 42B, 42C, 42D is non-circular. In other embodiments, the cross-sectional shape of each of the plurality of cooling channels 42A, 42B, 42C, 42D may be circular.

Figure 7:
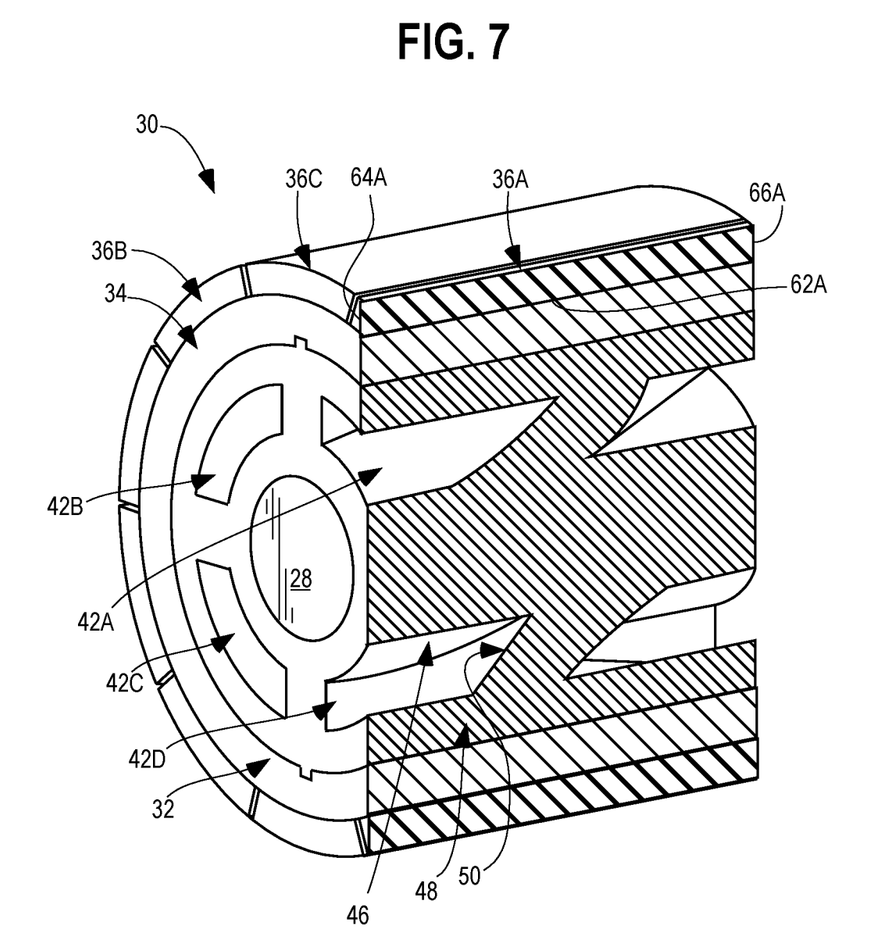
FIG. 7 is a cross-sectional view of the non-magnetic rotor hub showing that at least a portion of a surface area of each of the plurality of magnets overlaps more than one of the plurality of cooling channels when viewed radially.

Turning again to the magnetic rotor drum 30, each of the plurality of magnets 36 includes a surface area 62 defined between axial ends 64, 66 and circumferential ends 68, 70 of the magnet 36. At least some of the surface area 62 of each of the plurality of magnets 36 overlaps one or more of the plurality of cooling channels 42A, 42B, 42C, 42D when viewed radially as shown in FIG. 7. For example, a first magnet 36A has a surface area 52A that overlaps a first cooling channel 42A and a second cooling channel 42B of the plurality of cooling channels 42A, 42B, 42C, 42D.

Upon rotation of the shaft 26 about the axis 11, air is drawn through an inlet opening 72A, 72B, 72C, 72D of each of the cooling channels 42A, 42B, 42C, 42D to cool the magnetic rotor drum 30 and exits through an outlet opening 74A, 74B, 74C, 74D. Each inlet opening 72A, 72B, 72C, 72D is formed on the first face 38 at a first circumferential location as shown in FIG. 6A. Each outlet opening 74A, 74B, 74C, 74D is formed on the second face 40 at a second circumferential location as shown in FIG. 6B. Therefore, as shown in FIGS. 5 and 6A-C, each cooling channel 42A, 42B, 42C, 42D is skewed circumferentially as it extends from its respective inlet opening 72A, 72B, 72C, 72D to its respective outlet opening 74A, 74B, 74C, 74D.

Each inlet opening 72A, 72B, 72C, 72D and outlet opening 74A, 74B, 74C, 74D are at a same radial distance from the axis 11 in the illustrative embodiment. In some embodiments, the inlet openings 72A, 72B, 72C, 72D and the outlet openings 74A, 74B, 74C, 74D may be at different radial distances from the axis 11.

In the illustrative embodiment, the second circumferential location is offset from the first circumferential location by about 90 degrees. In some embodiments, the second circumferential location may be offset circumferentially between 20 degrees and 90 degrees from the first circumferential location. In other embodiments, the second circumferential location may be offset circumferentially from the first circumferential location by less than 20 degrees or greater than 90 degrees.

As shown in FIGS. 6A-C, each of the plurality of cooling channels 42A, 42B, 42C, 42D have a circumferential arc angle 428 and each of the plurality of magnets 36 have a circumferential arc angle 368. Thus, the circumferential length of each of the plurality of cooling channels 42A, 42B, 42C, 42D is greater than the circumferential length of any one of the plurality of magnets 36. In the illustrative embodiment, the number of the plurality of cooling channels 42A, 42B, 42C, 42D is less than the number of the plurality of magnets 36. In other embodiments, the number of the plurality of cooling channels 42A, 42B, 42C, 42D may be equal to the number of the plurality of magnets 36.

As shown in FIGS. 6A-C, when air is drawn through the plurality of cooling channels 42A, 42B, 42C, 42D upon rotation of the shaft 28 about the axis 11, each of the plurality of cooling channels 42A, 42B, 42C, 42D cools at least a portion of the rotor drum body 34 and more than one magnet of the plurality of magnets 36. At least a portion of the inlet opening 72A and the outlet opening 74A of a first cooling channel 42A of the plurality of cooling channels 42A, 42B, 42C, 42D is circumferentially aligned with separate magnets 36 included in the plurality of magnets 36.

A first magnet 36A and a second magnet 36B of the plurality of magnets 36 each have a first (axial) end 64A, 64B and a second (axial) end 66A, 66B axially spaced from the first (axial) end 64A, 64B. A third magnet 36C is positioned circumferentially between the first magnet 36A and the second magnet 36B. At least a portion of the inlet opening 72A is circumferentially aligned with the first end 64A of the first magnet 36A, while at least a portion of the outlet opening 74A is circumferentially aligned with the second end 66B of the second magnet 42B. Thus, in the illustrative embodiment, the first cooling channel 42A contributes to cooling at least three magnets 36A, 36B, 36C. In the illustrative embodiment, each of the plurality of cooling channels 42A, 42B, 42C, 42D contributes to cooling at least three magnets of the plurality of magnets 36. In other embodiments, each of the plurality of cooling channels 42A, 42B, 42C, 42D may cool at least one magnet of the plurality of magnets 36.

A method for assembling the electric machine 20 of the present disclosure includes the steps of forming the plurality of cooling channels 42A, 42B, 42C, 42D in the non-magnetic rotor hub 32 so that each of the plurality of cooling channels 42A, 42B, 42C, 42D skews circumferentially as the cooling channel extends axially relative to the axis 11, coupling the non-magnetic rotor hub 32 with the shaft 26, and coupling the non-magnetic rotor hub 32 with the magnetic rotor drum 30 so that the rotor drum body 34 extends circumferentially around the non-magnetic rotor hub 32.

A typical electric machine for a gas turbine engine may have a high temperature around a shaft and magnetic rotor drum of a motor of the electric machine. This is caused by no active cooling provided in the electric machine. The lack of active cooling reduces the operating life of the motor and/or the electric machine for continuous operating conditions. The operating life is reduced at least in part because of the temperature of the magnets of the magnetic rotor hub rising and causing demagnetization. Therefore, cooling of the magnetic rotor drum is important of prolong the operating of the life of the motor and/or the electric machine. Some solutions for cooling the magnetic rotor drum include utilizing external fans as a separate structure in the electric machine, which adds additional weight and requires some components of the electric machine to be modified to provide cooling air to other components.

The present disclosure includes a non-magnetic rotor hub 32 coupled with the magnetic rotor drum 30 and the shaft 26. The non-magnetic rotor hub 32 is designed to be light without compromising mechanical strength and to not induce significant parasitic drag to the magnetic rotor drum 30. For example, the magnitude of the axial air velocity induced by the non-magnetic rotor hub 32 may be relatively small compared to the air velocity of the Couette flow caused by rotation about the axis 11. Thus, skin friction drag does not change significantly since the overall air velocity may be dominated by the Couette flow.

The plurality of cooling channels 42A, 42B, 42C, 42D act as a suction pump drawing in air to cool the magnetic rotor drum 30. The non-magnetic rotor hub 32 is made of a non-magnetic material so the electromagnetic performance of the magnetic rotor drum 30 is not affected. The non-magnetic rotor hub 32 provides mechanical coupling between the shaft 26 and the magnetic rotor drum 30. The non-magnetic rotor hub 32 of the present disclosure may be used in an electric machine 20 and/or electric machine 20 which does not have a cooling environment to cool the magnetic rotor drum 30.

The non-magnetic rotor hub 32 of the present disclosure may be solid, rigid, and/or high strength. The material of the non-magnetic rotor hub 32 may be a material with a similar coefficient of thermal expansion as the material of the rotor drum body 34. For example, the non-magnetic rotor hub 32 may be Inconel 718 and the rotor drum body 34 may be iron-cobalt. The non-magnetic rotor hub 32 may be steel or titanium. The components of the electric machine 20 and/or electric machine 20, including the non-magnetic rotor hub 32 may be manufacture with computer numerical control machining and/or milling.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric machine adapted for use in a gas turbine engine, the electric machine comprising
   a shaft extending along an axis and configured to rotate about the axis,
   a magnetic rotor drum that includes a rotor drum body and a plurality of magnets arranged circumferentially about the axis and coupled with the rotor drum body for rotation therewith, and
   a non-magnetic rotor hub rotatably coupled with the shaft and the magnetic rotor drum and configured to cool the magnetic rotor drum in response to rotation of the shaft about the axis, the non-magnetic rotor hub having a first face, a second face spaced apart axially from the first face, and a plurality of cooling channels that extend axially through the non-magnetic rotor hub and open into the first face and the second face,
   wherein each of the plurality of cooling channels have an inlet opening formed on the first face at a first circumferential location and an outlet opening formed on the second face at a second circumferential location offset from the first circumferential location, and each of the plurality of cooling channels are skewed circumferentially as the plurality of cooling channels extend from the inlet opening to the outlet opening to cause air to be drawn through the plurality of cooling channels and cool the magnetic rotor drum in response to rotation of the shaft about the axis.

2. The electric machine of claim 1, wherein the non-magnetic rotor hub has an inner ring arranged around the shaft, an outer ring spaced apart radially from the inner ring and coupled with the rotor drum body of the magnetic rotor drum, and a plurality of radially extending and circumferentially skewed walls that extend radially between the inner ring and the outer ring to define the plurality of cooling channels.

3. The electric machine of claim 2, wherein the inner ring has a constant diameter, the outer ring has a constant diameter, and each wall has a first circumferential surface and a second circumferential surface that is parallel with the first circumferential surface.

4. The electric machine of claim 2, wherein a cross-sectional shape of each of the plurality of cooling channels when viewed axially is fixed as each of the plurality of cooling channels extends axially and skews circumferentially.

5. The electric machine of claim 4, wherein the cross-sectional shape of each of the plurality of cooling channels is non-circular.

6. The electric machine of claim 1, wherein each of the plurality of cooling channels have a circumferential arc angle greater than a circumferential arc angle of any one of the plurality of magnets.

7. The electric machine of claim 6, wherein a number of the plurality of cooling channels is equal to or less than a number of the plurality of magnets.

8. The electric machine of claim 6, wherein each of the plurality of magnets has a surface area defined between axial ends and circumferential ends of the magnet and at least 50 percent of the surface area overlaps one or more of the plurality of channels when viewed radially.

9. The electric machine of claim 1, wherein the outlet opening of each of the plurality of cooling channels is offset circumferentially between 20 degrees and 90 degrees from the inlet opening of the respective cooling channel.

10. The electric machine of claim 9, wherein the inlet opening and the outlet opening of each of the plurality of cooling channels are at a same radial distance from the axis.

11. An electric machine adapted for use in a gas turbine engine,
    the electric machine comprising
    a shaft extending along a central axis and configured to rotate about the central axis,
    a magnetic rotor drum that includes a rotor and a plurality of magnets arranged circumferentially about the central axis and coupled with the rotor for rotation therewith, and
    a non-magnetic rotor hub rotatably coupled with the shaft and the magnetic rotor drum, the non-magnetic rotor hub having a plurality of cooling channels that skew circumferentially as they extend axially through the non-magnetic rotor hub to cause air to be drawn through the plurality of cooling channels and cool the magnetic rotor drum in response to rotation of the shaft about the axis.

12. The electric machine of claim 11, wherein each of the plurality of cooling channels include an inlet opening formed at a first circumferential location of the non-magnetic rotor hub and an outlet opening formed at a second circumferential location of the non-magnetic rotor hub that is offset from the first circumferential location, and the inlet opening is axially spaced from the outlet opening.

13. The electric machine of claim 12, wherein the inlet opening and the outlet opening of each of the plurality of cooling channels are at a same radial distance from the axis.

14. The electric machine of claim 12, wherein each of the plurality of magnets include a first end and a second end axially spaced from the first end, and at least a portion of the inlet opening of a first cooling channel of the plurality of cooling channels is circumferentially aligned with the first end of a first magnet of the plurality of magnets and at least a portion of the outlet opening of the first cooling channel is circumferentially aligned with the second end of a second magnet of the plurality of magnets.

15. The electric machine of claim 14, wherein a third magnet of the plurality of magnets is circumferentially positioned between the first magnet and the second magnet.

16. The electric machine of claim 11, wherein a number of the plurality of cooling channels is less than a number of the plurality of magnets.

17. The electric machine of claim 11, wherein each of the plurality of cooling channels have a circumferential arc angle greater than a circumferential arc angle of any one of the plurality of magnets.

18. The electric machine of claim 11, wherein each of the plurality of magnets has a surface area defined between axial ends and circumferential ends of the magnet and at least 50 percent of the surface area overlaps one or more of the plurality of channels when viewed radially.

19. A method comprising
forming a plurality of cooling channels in a non-magnetic rotor hub such that each of the plurality of cooling channels skews circumferentially as the cooling channel extends axially relative to an axis,
coupling the non-magnetic rotor hub with a shaft that extends axially into the non-magnetic rotor hub for rotation with the shaft, and
coupling the non-magnetic rotor hub with a magnetic rotor drum that includes a rotor and a plurality of magnets arranged circumferentially about the axis such that the rotor extends circumferentially around the non-magnetic rotor hub.

20. The method of claim 19, wherein the non-magnetic rotor hub has an inner ring having a constant diameter arranged around the shaft, an outer ring having a constant diameter spaced apart radially from the inner ring and coupled with the rotor of the magnetic rotor drum, and a plurality of radially extending and circumferentially skewed walls that extend radially between the inner ring and the outer ring to define the plurality of cooling channels and wherein an inlet opening and an outlet opening of each of the plurality of cooling channels are at a same radial distance.

* * * * *